June 19, 1962 P. MOTLEY 3,039,198
LOCATING DEVICE
Filed Dec. 9, 1959
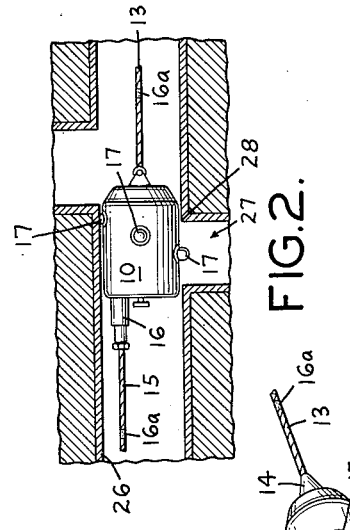
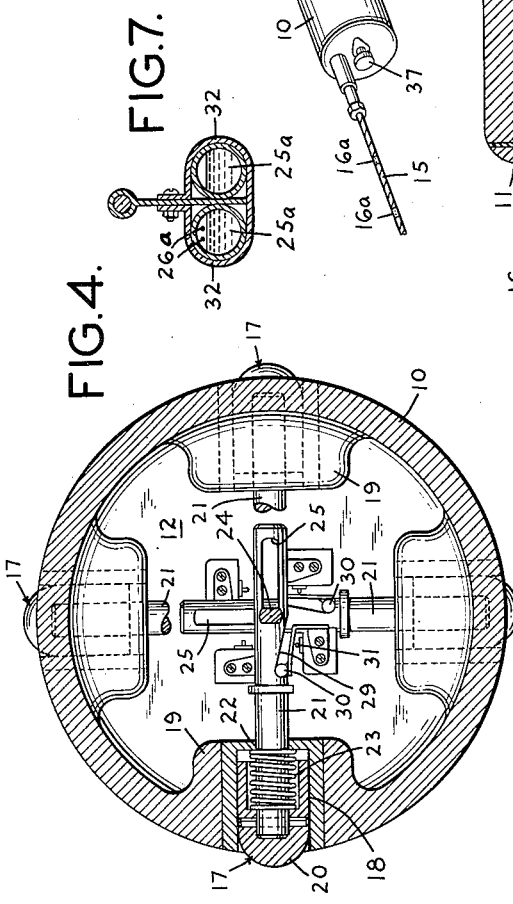
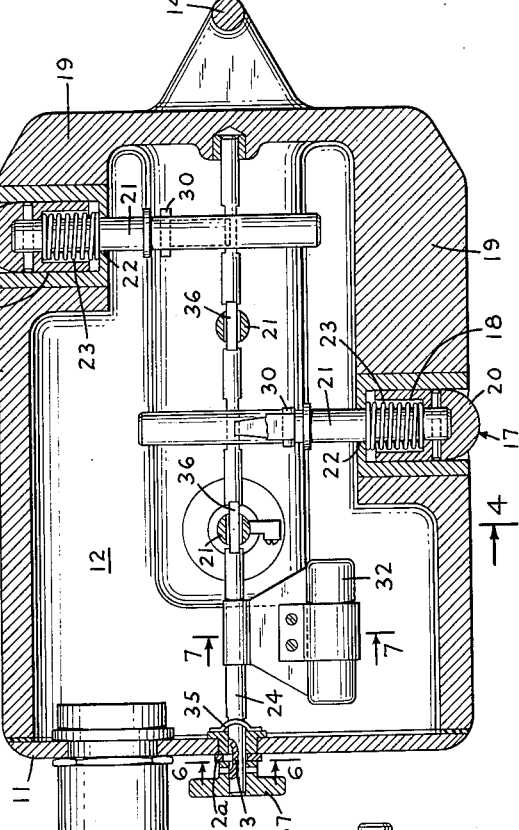
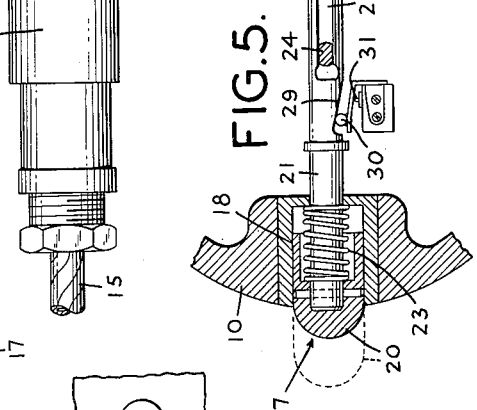
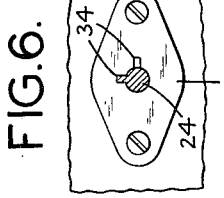
INVENTOR
PHILIP MOTLEY
BY
Brumbaugh, Free,
Graves & Donohue
HIS ATTORNEYS

3,039,198
LOCATING DEVICE
Philip Motley, % Peter Motley, 65 Todd Road, Valley Stream, N.Y.
Filed Dec. 9, 1959, Ser. No. 858,503
3 Claims. (Cl. 33—174)

The present invention relates to a locating device and more particularly to a device for locating spurs and settled sections in sewer lines and other conduits located beneath the ground.

Sewer lines and certain other types of conduits, generally installed several feet below the ground, ordinarily consist of a network of main lines and spurs running therefrom. When a particular line develops a leak or becomes clogged it is necessary to locate the line for the purpose of making repairs. Main lines are comparatively easy to find because they are usually charted or otherwise marked, but spur lines on the other hand often prove difficult to locate because they are not customarily marked.

It is commonly known that portions of both main lines and spurs may settle a few inches below the level of the rest of the line. Settling may cause a gradual accumulation of sediment or other material in the low portion of the line with the result that the line in time becomes entirely clogged. It is thus desirable to locate settled sections before the line becomes blocked by an accumulation of material in the settled section.

In the past workmen have followed the practice of locating spur lines and settled sections by making a calculated guess as to the approximate location of the line and digging in the general area until the line is uncovered. Since this method often necessitates digging several holes, it is expensive and may result in substantial damage to roadways and property in the immediate area.

A primary object of the present invention is to provide a device which may be inserted into sewer lines and other conduits located beneath the ground for the purpose of locating spurs and settled sections in such lines.

Another object is to provide a device which will operate effectively in the presence of extremely corrosive substances found in sewer lines.

These and other objects of the invention will become more apparent from the accompanying drawings, wherein:

FIGURE 1 is a perspective view of the locator;
FIGURE 2 is a plan view of the locator depicted in a sewer line adjacent to a spur line;
FIGURE 3 is an elevational view of the locator shown with portions of the housing cut away;
FIGURE 4 is a sectional view of the locator taken at line 4—4 of FIGURE 3;
FIGURE 5 is a view of a portion of the locator depicted in FIGURE 4 with the parts shown in a different position;
FIGURE 6 is a sectional view of a portion of the locator taken at line 6—6 of FIGURE 3; and
FIGURE 7 is a sectional view of a portion of the locator taken at line 7—7 of FIGURE 3.

The present invention comprises a locating device (FIGURE 1) which is inserted into and drawn through a sewer line (FIGURE 2) for the purpose of detecting spurs and settled sections in the line. The locator has a cylindrical housing 10 with a diameter slightly less than that of a standard size sewer line. The housing 10 and a closure plate 11, detachably affixed to one end thereof, define a water-tight chamber 12 (FIGURE 3) in which working parts of the locator are contained free from harmful corrosive materials ordinarily found in sewer lines. Preferably, the housing is made from corrosive resistant material, such as galvanized iron.

A cable 13 is attached to an eyelet 14 on the front of the housing (FIGURES 1 and 2). After the cable is introduced into the sewer line by means of a snake, the cable is used to draw the locator through the line. A second hollow cable 15, containing electrical wires (not shown) disposed between detecting mechanisms in the housing and indicators in the hands of the operator on the surface, is affixed to a sleeve 16 on the closure plate 11. When necessary the hollow cable 15 may be used to pull the locator to the rear and out of the line. Both of the cables have markings 16a at intervals to provide a means for measuring the distance from the surface to the locator at any given point in the line.

Four feeler arms 17 (FIGURE 4) for detecting spur lines, are slidably mounted in cavities 18 formed in thick portions 19 of the housing walls transverse to the axis of the housing. The feeler arms are situated in different positions along the axis of the housing (FIGURE 3), so that one arm does not interfere with the operation of other arms, and are spaced at 90° intervals along the circumference of the housing (FIGURE 4), so that at least one of the arms faces a spur line irrespective of the rotational position of the locator and the angle at which the spur joins the main line (FIGURE 2).

Each feeler arm has a hollow cylindrical head 20 rounded on one end and open at the other with approximately the same length and diameter as the cavity 18 in which it is located (FIGURE 3). Attached to the head 20 in the hollow portion is a stem 21 which extends through a hole 22 in the bottom of the cavity 18 into the chamber 12. To prevent seepage of water or corrosive material into the chamber, the stem and head are adapted to fit snugly into the cavity and hole.

A spring 23, compressed in the opening of the head and bearing against the bottom of the cavity, drives the feeler arm outwardly in a direction away from the axis of the housing. Movement of the feeler arm is limited by a shaft 24 mounted along the axis of the housing through a longitudinal slot 25 in the stem 21 (FIGURE 3). Since the slot 25 is slightly less in length than the head 20, the shaft prevents the spring from driving the entire head from the cavity 18.

When the locator is inserted into a sewer line, the spring-driven feeler arms 17 normally bear against the walls 26 of the line and are maintained almost entirely within the housing (FIGURE 2). As the device is pulled into a position adjacent a spur line, at least one of the arms will move outward approximately an inch into the open area 27 of the spur line. Then, as the operator pulls the locator past the spur line, the corner or junction 28 of the spur line with the main line acts against the rounded surface of the head 20 causing the feeler arm to resume its normal position in the housing.

The stem 21 of each feeler arm has a beveled camming surface 29 adapted to engage a spring-type cam follower 30 (FIGURE 5). As the feeler arm moves outward, the camming surface 29 on the arm acts against the cam follower 30 causing it to touch an electrical contact point 31 located adjacent to the cam follower. This completes an electrical circuit through wires (not shown) attached to the spring and contact point and leading through the hollow cable 15 to indicators in the hands of the operator on the surface. Upon receipt of an electrical signal from the locator, the operator notes the markings on the cable and thus may accurately determine the location of the spur line.

The mechanism for detecting settled sections in sewer lines comprises a pair of elongated capsules 32 (FIGURES 3 and 7) mounted on the shaft 24 parallel to the axis of the housing. Each capsule is partially filled with an electrically conductive fluid 25a and has a pair of contact points 26a adapted to lie above the fluid level when the capsule is in horizontal position. The contact points 26a are mounted at opposite ends of the capsules so that when the locator is tilted substantially from its normal horizontal position in either direction, the fluid in one capsule rises above the points and completes an electrical circuit through wires (not shown) attached to the points and running to indicators in the hands of the operator. The same result may be achieved by employing a single capsule with a set of electrical contact points at each end of the capsule.

The locator also has a mechanism for locking the feeler arms in internal position so that the device may be readily inserted into the sewer line. The shaft 24, rotatably mounted in the housing through a small plate 32a (FIGURES 3 and 6) affixed to the back of the housing, has a rib 33 adapted to engage notches 34 in the plate. The shaft is biased by a spring 35 and has flattened sections 36 adjacent to the slots 25 in each feeler arm. The slots 25 are formed in the shape of a keyhole (FIGURES 4 and 5), the larger portion of the slot having the full diameter of the shaft and the smaller portion of the slot having the diameter of the flattened portion of the shaft. To lock the feeler arms in internal position, all four arms 17 are manually depressed into the housing and the shaft 24 is pulled out by a knob 37 and rotated a quarter turn. With the feeler arms locked in this position (FIGURE 4), the locator may be readily inserted into the sewer line. Once the device is in the line, the operator need only pull the shaft out and turn the knob in the opposite direction to release the arms. With the shaft in this position (FIGURE 5), the feeler arms are freely movable and bear against the walls of the sewer line.

While the present invention has been described with reference to the specific device shown in the accompanying drawing, it is not to be limited save as defined in the appended claims.

I claim:
1. A locating device comprising a housing, at least one feeler arm slidably mounted in the housing and movable in a direction transverse to the axis thereof, said feeler arm having a head rounded at one end and extending through the walls of the housing, spring means urging the feeler arm outwardly, means limiting outward movement of the feeler arm to less than the length of the head, and means to report movement of the feeler arm.

2. A locating device comprising a housing, at least one feeler arm slidably mounted in the housing and movable in a direction transverse to the axis thereof, said feeler arm having a stem with a longitudinal slot formed in the shape of a keyhole, a rotatable shaft mounted along the axis of the housing through the slot and having the diameter of the larger portion of the slot, said shaft having a flattened portion adjacent the stem with the diameter of the smaller portion of the slot, spring means urging the feeler arm outwardly, and means associated with the feeler arm to report movement of said arm.

3. A locating device comprising a housing, at least one feeler arm slidably mounted in the housing and movable in a direction transverse thereof, said feeler arm having a head rounded at one end and extending through the walls of the housing and said feeler arm having a stem with a longitudinal slot, spring means urging the feeler arm outwardly, a shaft mounted in the housing through the slot, and means to report movement of the feeler arm.

References Cited in the file of this patent

UNITED STATES PATENTS

| | | |
|---|---|---|
| 1,375,278 | Clayton | Apr. 19, 1921 |
| 1,928,971 | Dillon et al. | Oct. 3, 1933 |
| 2,074,753 | McClain | Mar. 23, 1937 |
| 2,619,728 | Ely | Dec. 2, 1952 |